(12) United States Patent  
Toukairin

(10) Patent No.: US 6,370,020 B1
(45) Date of Patent: Apr. 9, 2002

(54) DISPLAY APPARATUS WITH ROTATION MECHANISM

(75) Inventor: Tsutoo Toukairin, Yamagata (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/563,616

(22) Filed: May 2, 2000

(30) Foreign Application Priority Data

May 6, 1999  (JP) ............................................ 11-126439

(51) Int. Cl.$^7$ ................................................. G06F 1/16
(52) U.S. Cl. ........................ 361/681; 361/682; 248/349; 248/425; 248/917; 248/922; 174/86
(58) Field of Search ................................ 361/681, 682; 248/917–924, 349, 425; 174/70, 86

(56) References Cited

U.S. PATENT DOCUMENTS

| | | | | |
|---|---|---|---|---|
| 3,936,026 A | * | 2/1976 | Hampel et al. | 248/349 |
| 4,547,027 A | * | 10/1985 | Scheibenreif | 248/349 |
| 4,768,744 A | * | 9/1988 | Leeds et al. | 248/349 |
| 4,905,543 A | * | 3/1990 | Choi | 248/922 |
| 5,335,142 A | * | 8/1994 | Anderson | 361/681 |
| 5,569,895 A | * | 10/1996 | Lynch et al. | 248/923 |
| 5,715,138 A | * | 2/1998 | Choi | 361/681 |
| 5,923,528 A | * | 7/1999 | Lee | 361/681 |
| 6,108,195 A | * | 8/2000 | Behl et al. | 361/681 |

FOREIGN PATENT DOCUMENTS

| | | |
|---|---|---|
| JP | 4238516 | 8/1992 |
| JP | 9282051 | 10/1997 |
| JP | 10207383 | 8/1998 |

* cited by examiner

Primary Examiner—Leo P. Picard
Assistant Examiner—Lisa Lea-Edmonds
(74) Attorney, Agent, or Firm—Ostrolenk, Faber, Gerb & Soffen, LLP

(57) ABSTRACT

A plurality of conductor rings (16a, 16b, . . . , 16n) disposed concentrically with respect to a rotation axis X, and opposite terminals (19a, 19b, . . . , 19n) for coming into contact with the above-described respective conductor rings are provided, and these conductor rings and opposite terminals which come into contact with each other are connected to any one of electric circuits on a side of the above-described display section and on a side of the base section, respectively.

8 Claims, 3 Drawing Sheets

DISPLAY APPARATUS WITH ROTATION MECHANISM

BACKGROUND OF THE INVENTION

The present invention relates to a display apparatus with a rotation mechanism, capable of, while rotatably connecting a display section with a base section, always maintaining the connection between electric circuits of both of the sections.

In a cathode-ray tube display apparatus (referred to as a "CRT", hereinafter) and a liquid crystal display apparatus (referred to as an "LCD", hereinafter), accommodation of a display section, an adjustment of an angle of view or an operation for rotating a display section to a base section for a presentation and so forth are often conducted. Especially with regard to a CRT having heavy weight, since it is difficult to manually rotate it, for making smooth right and left rotation possible, a rotation stand using a roller is proposed in JP-A-238516/1992, for example. In this case, a cable for electrically connecting a CRT with a main body of a computer is disposed outside the rotation stand, and is made to have a surplus length so as not to prevent the rotation of the CRT placed on the rotation stand.

Also, recently, in association with popularization of a personal computer integrally formed with an LCD, a kind of machine has been developing, in which not only a display section is rotated in upper and lower directions for accommodation of the display section or an adjustment of an angle of view, but the display section can be rotated to the extent of 180 degrees in a horizontal direction (right and left directions) for a presentation and so forth. For example, in JP-A-282051/1997 and JP-A207383/1998, a personal computer integrally formed with an LCD is proposed, in which a display section can rotate to a base section including a main body of the computer not only in a perpendicular direction (upper and lower directions), but also in a horizontal direction. In these personal computers integrally formed with an LCD, a cable for electrically connecting a side of the base section with a side of the display section is inserted through a pipe that becomes to be respective rotation axes in a perpendicular direction and a horizontal direction.

However, even in the above-described rotatable display section, the cable disposed outside or inside the rotation axes (pipe) is twisted or pulled by means of rotation, and if an angle of rotation is increased or the rotation is continued only in one direction, there are cases in which the rotation stops, a connector of the cable is detached, and extremely a disconnection occurs, and free and smooth rotation is prevented.

SUMMARY OF THE INVENTION

The objective of the present invention is to solve the above-described tasks.

Also, the objective of the present invention is to provide a display apparatus with a rotation mechanism, capable of, while rotatably connecting a display section with a base section, always maintaining the connection between electric circuits of both of the sections.

In order to solve the above-described tasks, the present invention provides a display apparatus with a rotation mechanism provided for rotatably connecting a display section with a base section, wherein this rotation mechanism has a plurality of conductor rings disposed concentrically with respect to a rotation axis, and opposite terminals for coming into contact with the respective conductor rings, and these conductor rings and opposite terminals which come into contact with each other are connected to any one of electric circuits on a side of the above-described display section and on a side of the base section, respectively.

In the above-described display apparatus with the rotation mechanism of the present invention, since, even though the display section and the base section rotate around the rotation axis in any manner, the plurality of conductor rings provided in any one of the display section and the base section always come into contact with the opposite terminals provided in the other, a cable is not twisted or pulled, and the connection of the electric circuits on a side of the display section and on a side of the base section is always maintained.

The above-described plurality of conductor rings may be placed along the above-described rotation axis in parallel with each other, and may have different diameters, respectively, and may be placed concentrically with respect to the above-describe rotation axis.

Especially, in case that the display section and the base section are rotatably connected with each other by a cylindrical neck section, it is preferable that the plurality of conductor rings are placed along the above-described rotation axis in parallel with each other, and in case that the display section and the base section are connected with each other by a rotation surface such as a rotation stand, it is preferable that the above-described plurality of conductor rings are placed concentrically with respect to the rotation axis.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Below, embodiments of the present invention will be explained by using drawings.

(Embodiment 1)

Figure 1:
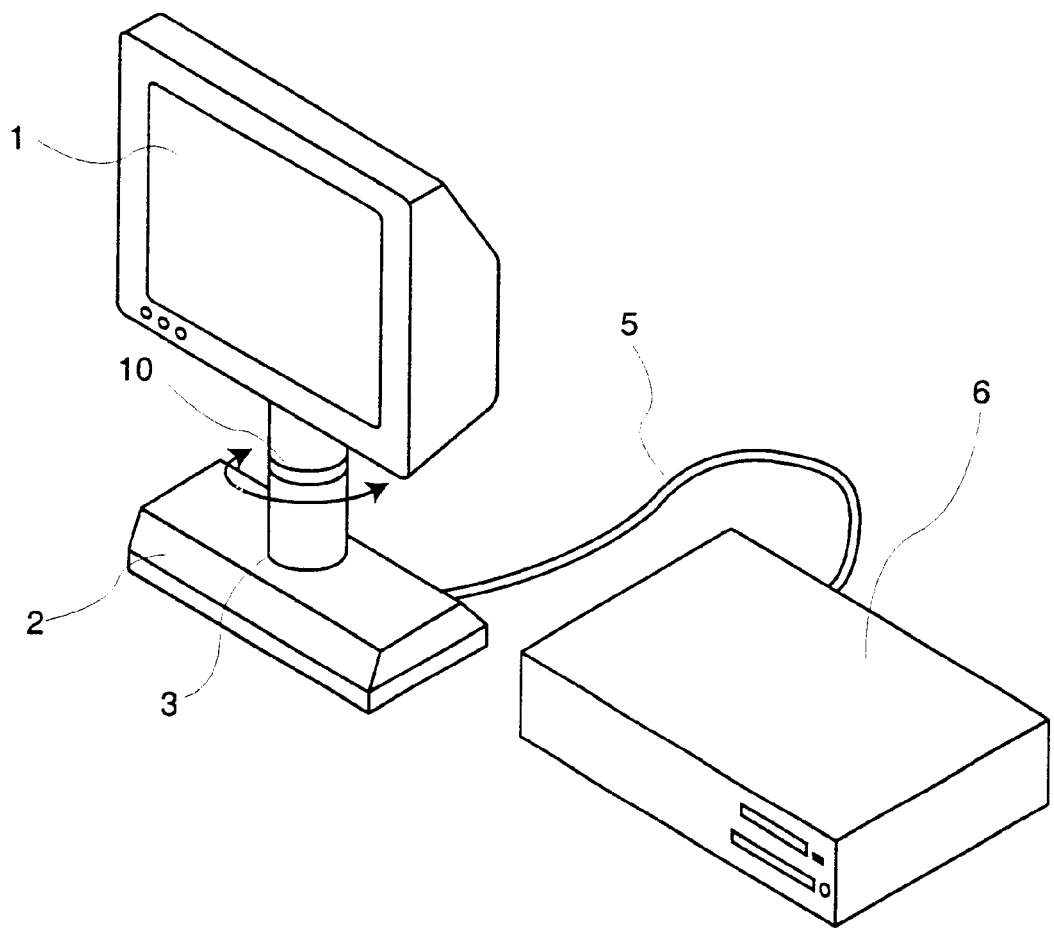
FIG. 1 is an oblique view showing one embodiment of the present invention.

As shown in FIG. 1, in a display apparatus of this embodiment, a display section 1 consisted of a liquid crystal plate, and a base section 2 are connected with each other through a cylindrical neck section 3 which stands from the base section, and are made to be rotatable in a horizontal direction (right and left directions) by a rotation mechanism 10 built in this neck section 3. A cable 5 extends from the base section 2, and is connected to a personal computer 6.

Figure 2:
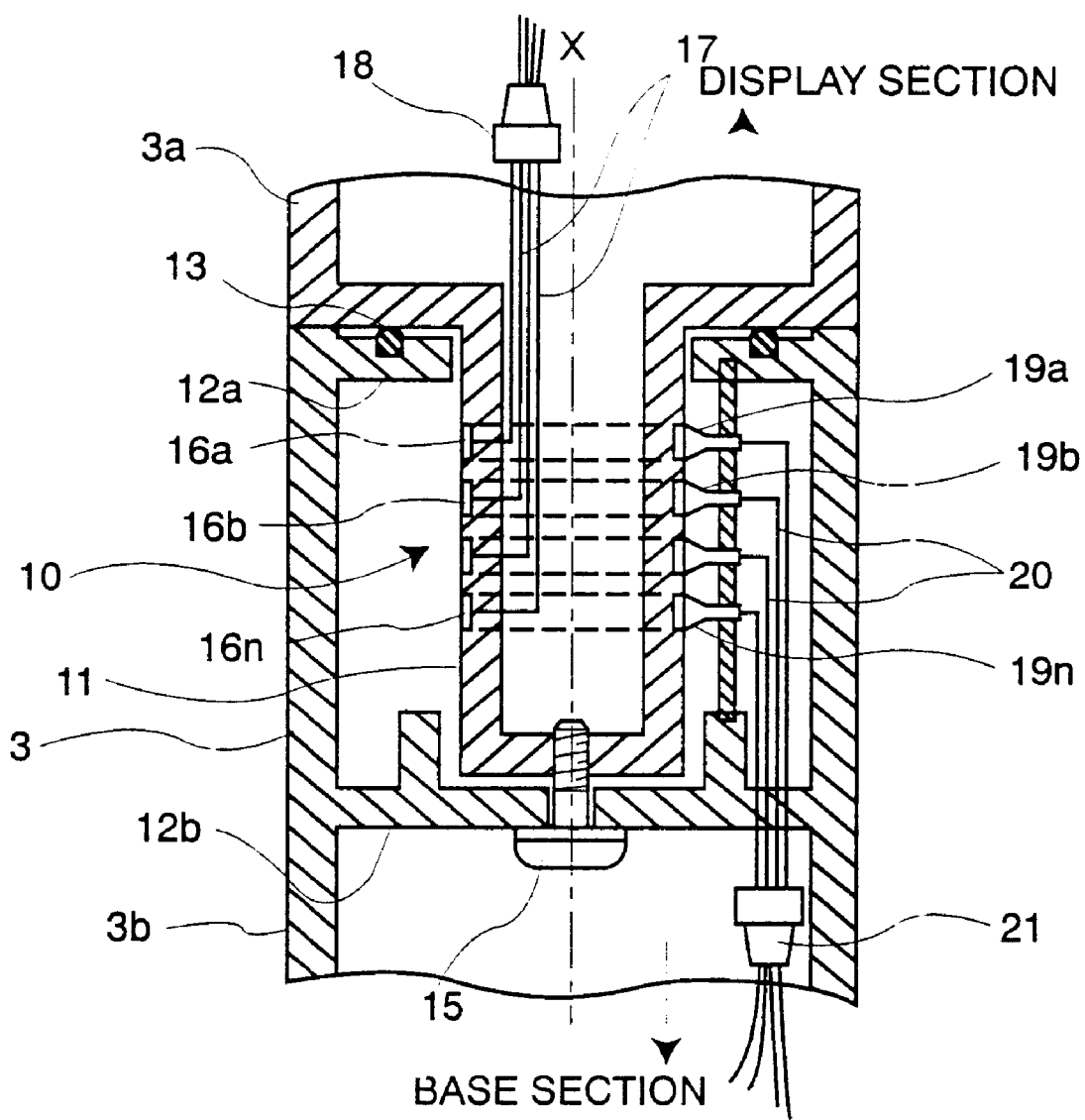
FIG. 2 is a cross sectional view showing a rotation mechanism in the embodiment of FIG. 1 by cutting it along a plane passing a rotation axis X.

As shown in FIG. 2, the above-described neck section 3 is divided into a member 3a on a side of the display section in an upper part and a member 3b on a side of the base section in a lower part, and the rotation mechanism 10 is built in these divided parts.

A cylindrical section 11 having a small diameter extends concentrically with respect to a rotation axis X from a lower end part of the above-described member 3a on a side of the display section into the member 3b on a side of the base section. Also, two stages of upper and lower partition plates 12a and 12b are formed in a direction along the rotation axis X from an inner wall of the member 3b on a side of the base section, and the above-described cylindrical section 11 is rotatably supported in a central part of these partition plates 12a and 12b, and thereby, the member 3a on a side of the display section is rotatably connected with the member 3b on a side of the base section. For making the rotation smooth, balls 13 for coming into rolling contact with a bottom surface of the member 3a on a side of the display section are attached to an upper surface of the upper stage partition plate 12a, and also, in order to prevent the member 3a on a side of the display section 3a from coming off the member 3b on a side of the base section, a bottom surface of the cylindrical section 11 is fixed by a bolt 15 that rotatably passes through an axis core section of the lower stage partition plate 12b.

A plurality of conductor rings 16a, 16b, . . . , 16n are attached to a circumferential wall of the above-described cylindrical section 11 along the rotation axis X in parallel with each other. Leads 17 are drawn out from these conductor rings 16a, 16b, . . . , 16n, respectively, and these leads 17 are connected to an electric circuit on a side of the display section 1 through a connector 18.

On the other hand, opposite terminals 19a, 19b, . . . , 19n for coming into contact with the above-described respective conductor rings 16a, 16b, . . . , 16n are attached to an inside of the member 3b on a side of the base section, and leads 20 are drawn out from these opposite terminals 19a, 19b, . . . , 19n, respectively, and these leads 20 are connected to an electric circuit on a side of the base section 2 through a connector 21, namely, to an electric circuit within the personal computer 6.

The display apparatus having the above-described rotation mechanism 10 can freely rotate the display section 1 in any direction of right and left with the base section 2 fixed, and even though the rotation is continued in one direction, the rotation is not restricted. Also, since the opposite terminals 19a, 19b, . . . , 19n always come into contact with the conductor rings 16a, 16b, . . . , 16n independent of the existence, magnitude or direction of the rotation, even though the display section 1 is rotated in any manner, continuity between the circuit on a side of the display section and the circuit on a side of the base section Is not obstructed.

By providing a click stop mechanism in the above-described rotation mechanism, the display section 1 may be constructed so as to stop by means of a click, for example every time the display section rotates by 45 degrees from a front. Also, by adding a motor rotation mechanism to this rotation mechanism, the display section 1 may be constructed so as to rotate continuously or intermittently in a specific direction or by a specific angle by means of electrical instruction from a side of the base section. In this display section 1, display plates may be provided on both sides. Further, the rotation axis X in the above-described rotation mechanism is set not only in a perpendicular direction but also in a horizontal direction or in an inclined direction.

The above-described base section 2 may be Integrally formed with the personal computer 6, and also, the above-described rotation mechanism may be used as a rotation mechanism of a display section in a personal computer integrally formed with an LCD. It goes without saying that these are included in the display apparatus with the rotation mechanism of the present invention.

(Embodiment 2)

Figure 3:
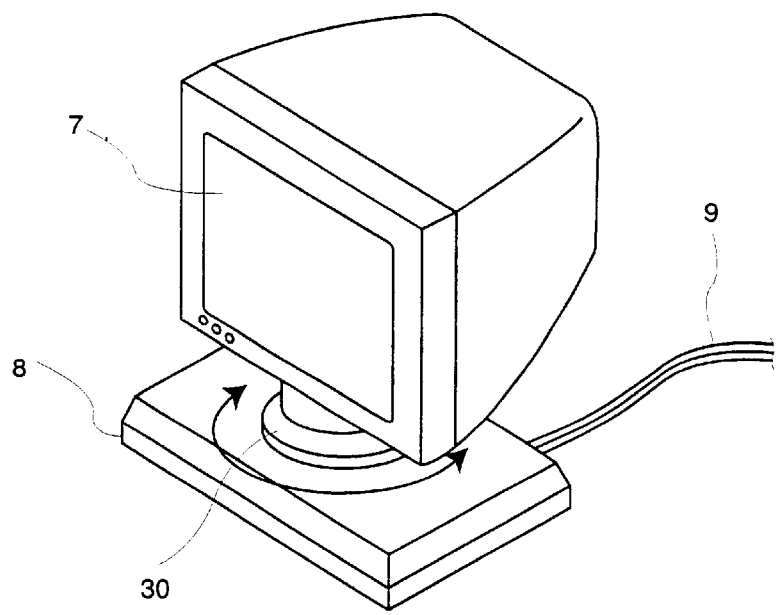
FIG. 3 is an oblique view showing another embodiment of the present invention.

As shown in FIG. 3, in a display apparatus of this embodiment, a display section 7 consisted of a cathode-ray tube, and a base section 8 are connected with each other rotatably in a horizontal direction (right and left directions) through a rotation mechanism 30, and a cable 9 extends from this base section 8, and is connected to a personal computer that is not shown in the figures.

Figure 4:
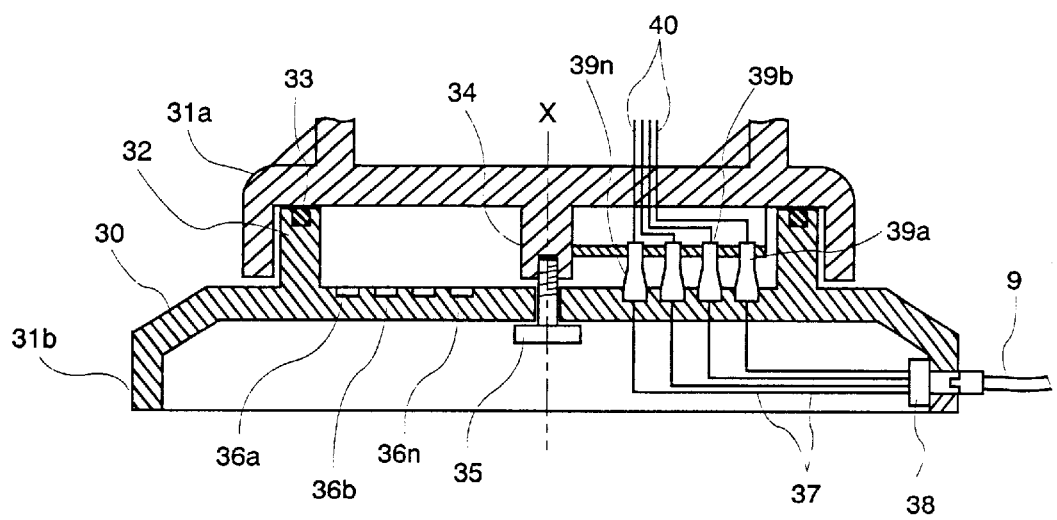
FIG. 4 is a cross sectional view showing a rotation mechanism in the embodiment of FIG. 3 by cutting it along a plane passing a rotation axis X.

As shown in FIG. 4, the above-described rotation mechanism 30 is divided into a member 31a on a side of the display section and a member 31b on a side of the base section. A cylindrical longitudinal rib 32 stands on an upper surface of the member 31b on a side of the base section concentrically with respect to a rotation axis X, and balls 33 are attached to an upper side of this longitudinal rib 32. Also, a rotation axis section 34 hangs down from a center of the member 31a on a side of the display section. When the member 31a on a side of the display section is placed on the member 31b on a side of the base section and is supported by abutting against the above-described balls 33, this rotation axis section 34 is fixed by a bolt 35 that rotatably passes through an axis core of the member 31b on a side of the base section, so as not to come off the member 31b on a side of the base section.

A plurality of conductor rings 36a, 36b, . . . , 36n having different diameters, respectively, on an inner side surrounded by the above-described longitudinal rib 32 are placed on an upper surface of the above-described member 31b on a side of the base section concentrically with respect to the rotation axis X. Leads 37 are drawn out from these conductor rings 36a, 36b, . . . , 36n, respectively, and these leads 37 are connected to a cable 9 through a connector 38 of a base section terminal, namely, to an electric circuit within a personal computer that is not shown in the figures.

On the other hand, opposite terminals 39a, 39b, . . . , 39n for coming into contact with the above-described respective conductor rings 36a, 36b, . . . , 36n are attached to a lower part of the member 31a on a side of the display section, and leads 40 are drawn out from these opposite terminals 39a, 39b, . . . , 39n, respectively, and these leads 40 are connected to an electric circuit on a side of the display section.

The display apparatus having the above-described rotation mechanism 30 can freely rotate the display section 7 in any direction of right and left with the base section 8 fixed, and even though the rotation is continued in one direction, the rotation is not restricted. Also, since the opposite terminals 39a, 39b, . . . , 39n always come into contact with the conductor rings 36a, 36b, . . . , 36n independent of the existence, magnitude or direction of the rotation, even though the display section 7 is rotated in any manner, continuity between the circuit on a side of the display section and the circuit on a side of the base section is not obstructed.

Since the display apparatus with the rotation mechanism of the present invention has a plurality of conductor rings disposed concentrically with respect to a rotation axis, and opposite terminals for coming into contact with the above-described respective conductor rings, and these conductor rings and opposite terminals which come into contact with each other are connected to any one of electric circuits on a side of the above-described display section and on a side of the base section, respectively, while rotatably connecting the display section with the base section, the display apparatus can always maintain the connection between electric circuits of both of the sections.

The entire disclosure of Japanese Patent Application No. 11-126439 filed on May 6, 1999 including specification, claims, drawing and summary are incorporated herein by reference in its entirety.

What is claimed is:

1. A display apparatus with a rotation mechanism provided for rotatably connecting a display section with a base section,
wherein
said rotation mechanism has a plurality of conductor rings disposed concentrically with respect to a rotation axis, and opposite terminals for coming into contact with said respective conductor rings, and said conductor rings and said opposite terminals which come into contact with each other are connected to any one of electric circuits on a side of said display section and on a side of said base section, respectively.

2. A display apparatus with a rotation mechanism according to claim 1, wherein said plurality of conductor rings are placed along said rotation axis in parallel with each other.

3. A display apparatus with a rotation mechanism according to claim 1, wherein said plurality of conductor rings have different diameters, respectively, and are placed concentrically with respect to said rotation axis.

4. A display apparatus with a rotation mechanism according to claim 1, wherein a click stop mechanism is provided in said rotation mechanism, and is constructed so as to stop by means of a click for every rotation.

5. A display apparatus with a rotation mechanism provided for rotatably connecting a display section with a base section,
wherein
said rotation mechanism has a plurality of conductor rings placed concentrically with respect to a rotation axis and in parallel with each other, and opposite terminals for coming into contact with said respective conductor rings, and said conductor rings are connected to an electric circuit on a side of said display section, and said opposite terminals are connected to an electric circuit on a side of said base section.

6. A display apparatus with a rotation mechanism provided for rotatably connecting a display section with a base section,
wherein
said rotation mechanism has a plurality of conductor rings placed concentrically with respect to a rotation axis and with diameters different from each other, and opposite terminals for coming into contact with said respective conductor rings, and said conductor rings are connected to an electric circuit on a side of said display section, and said opposite terminals are connected to an electric circuit on a side of said base section.

7. A display apparatus with a rotation mechanism, comprising a display section, a base section, and a neck section for connecting said display section with said base section,
wherein
said neck section has a section on a display section side and a section on a base section side, and a cylindrical section extends concentrically with respect to a rotation axis from a lower end part of said section on said display section side into said section of said base section side, two stages of upper and lower partition plates are formed in a direction along said rotation axis from an inner wall of said section on said base section side, and said cylindrical section is rotatably supported at a center part of said upper and lower partition plates, a plurality of conductor rings are attached to a circumferential wall of said cylindrical section along said rotation axis in parallel with each other, and said conductor rings are connected an electric circuit on a side of said display section, and opposite terminals for coming into contact with said plurality of conductor rigs are attached to an inside of said section on said base section side, and a plurality of said opposite terminals are connected to an electric circuit on a side of said base section.

8. A display apparatus with a rotation mechanism, comprising a display section, a base section, and a neck section for connecting said display section with said base section,
wherein
said neck section has a section on a display section side and a section on a base section side, and a cylindrical longitudinal rib stands on an upper surface of said section on said base section side concentrically with respect to a rotation axis, a plurality of conductor rings having different diameters on an inner side surrounded by said longitudinal rib are placed on an upper surface of said section on said base section side concentrically with respect to said rotation axis, and said plurality of conductor rings are connected an electric circuit on a side of said base section, and opposite terminals for coming into contact with said respective conductor rigs are attached to a lower part of said section on said display section side, and a plurality of said opposite terminals are connected to an electric circuit on a side of said display section.

* * * * *